(12) United States Patent
Weidman

(10) Patent No.: US 10,880,971 B2
(45) Date of Patent: *Dec. 29, 2020

(54) SIDE LOOKING OCCUPANCY SENSOR

(71) Applicant: The Watt Stopper, Inc., Carlsbad, CA (US)

(72) Inventor: Louia Weidman, Carlsbad, CA (US)

(73) Assignee: The Watt Stopper, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,166

(22) Filed: Mar. 18, 2019

(65) Prior Publication Data

US 2019/0215933 A1 Jul. 11, 2019

Related U.S. Application Data

(63) Continuation of application No. 15/864,821, filed on Jan. 8, 2018, now Pat. No. 10,244,608, which is a continuation of application No. 14/215,625, filed on Mar. 17, 2014, now Pat. No. 9,867,259.

(60) Provisional application No. 61/794,802, filed on Mar. 15, 2013.

(51) Int. Cl.
*H05B 47/105* (2020.01)
*G01S 7/481* (2006.01)
*G01S 17/04* (2020.01)
*G01S 17/86* (2020.01)

(52) U.S. Cl.
CPC .......... *H05B 47/105* (2020.01); *G01S 7/4813* (2013.01); *G01S 17/04* (2020.01); *G01S 17/86* (2020.01); *Y02B 20/40* (2013.01)

(58) Field of Classification Search
CPC ................ H05B 37/0227; H05B 37/02; H05B 33/0854; G05B 15/02; F24F 11/0034
See application file for complete search history.

(56) References Cited

U.S. PATENT DOCUMENTS

| 8,639,391 B1 * | 1/2014 | Alberth, Jr. | ............... H02J 4/00 700/286 |
| 2012/0147705 A1 * | 6/2012 | Hick | .................... H05B 47/105 367/93 |

* cited by examiner

*Primary Examiner* — James J Yang
(74) *Attorney, Agent, or Firm* — Crockett & Crockett, PC; K. David Crockett Esq.; Niky Economy Syrengelas, Esq.

(57) ABSTRACT

A side looking occupancy sensor is incorporated in a conventional wall switch mounted into a switch box adjacent to a door. The side-looking proximity sensor preferably is mountable to either side of the doorjamb to make the side-looking proximity sensor face the door opening. During operation, the side-looking sensor monitors the door movement or senses the passage of a person for indication that a person is entering or leaving the space. Entry and exit determination is made based on activation of the side-looking sensor.

2 Claims, 2 Drawing Sheets

SIDE LOOKING OCCUPANCY SENSOR

RELATED APPLICATIONS

This application is a continuation of U.S. application Ser. No. 15/864,821, filed Jan. 8, 2018, now U.S. Pat. No. 10,244,608, which is a continuation of U.S. application Ser. No. 14/215,625, filed Mar. 17, 2014, now U.S. Pat. No. 9,867,259, which in turn claims priority to U.S. Provisional Application 61/794,802, filed Mar. 15, 2013.

FIELD OF THE INVENTIONS

The inventions described below relate to the field of electrical controls and more specifically, sensors for automatically controlling electrical loads such as lighting.

BACKGROUND OF THE INVENTIONS

Occupancy sensors mounted in a doorjamb are known in the art. 20060176697 (application Ser. No. 11/053,554) to Arruda describes using an off-the-shelf combination light and sensor wall switch sensor that detects when the door is opened/closed to turn the light on/off in which the sensor and light are mounted together in a special structure that is mounted to or near the door frame or jamb. U.S. Pat. No. 6,023,224 to Meyvis describes a similar system that can be mounted within or to a door frame and includes a motion sensor. Sun9 offers a doorjamb mounted occupancy sensor that purports to count people entering and exiting (two different functions) so that lighting may be controlled instantaneously, particularly on exit of the last person. This is counter to typical motion-based occupancy sensors that assume a space is empty due to lack of motion (or sound or other monitored event). All of these systems suffer from the unneeded complexity of requiring special doorjambs or complicated mounting of special assemblies into or on to a door jamb.

SUMMARY

The devices and methods described below provide for a side looking occupancy sensor incorporated in a conventional wall switch mounted into a switch box adjacent to a door opening. The side-looking proximity sensor preferably is mountable to either side of the doorjamb to make the side-looking proximity sensor face the door opening. During operation, the side-looking sensor monitors the door movement or senses the passage of a person for indication that a person is entering or leaving the space. Entry and exit determination is made based on activation of the side-looking sensor.

The invention resolves issues of counting-type occupancy sensors by taking advantage of the normal position of a wall switch relative to a door. In most installations, a wall switch is adjacent the door, typically within one foot of the edge of the door opening.

The side looking sensor has two zones of monitoring: a first zone close to the door opening; and a second zone at a slight distance away from the door opening into the room. This allows determination of direction, e.g., if the first zone is activated before the second zone, the person enters. If the second zone is activated first, then the person is exiting. A counter is incremented for entering and decremented for exiting. When the counter goes to zero, no one is left in the room and the connected loads may be powered off.

A standard motion sensor may also be provided that maintains lighting based on standard occupancy sensing (e.g., passive infrared, ultrasound, sound, etc.) as may a daylight sensor, as both are known in the art. The standard motion sensor may optionally be used to confirm when no one is left in the room. When no one is in the room, the lights are preferably turned out to save energy.

A side looking occupancy sensor includes a load control device having a housing and controller, one or more active infrared proximity sensors in the housing and operably coupled to the controller along with one or more optical elements optically coupled to each of the one or more infrared proximity sensors and a passive infrared sensor in the housing and operably coupled to the controller.

A side looking occupancy sensor controlling the application of electrical power to electrical loads in a room with a doorway includes a load control device having a housing and controller wherein the load control device is mounted adjacent to the doorway and one or more active infrared proximity sensors in the housing and operably coupled to the controller for sensing people passing through the doorway. One or more optical elements are optically coupled to each of the one or more infrared proximity sensors and a passive infrared sensor is included in the housing and operably coupled to the controller for sensing when people remain and leave the room.

DETAILED DESCRIPTION OF THE INVENTIONS

Figure 1:
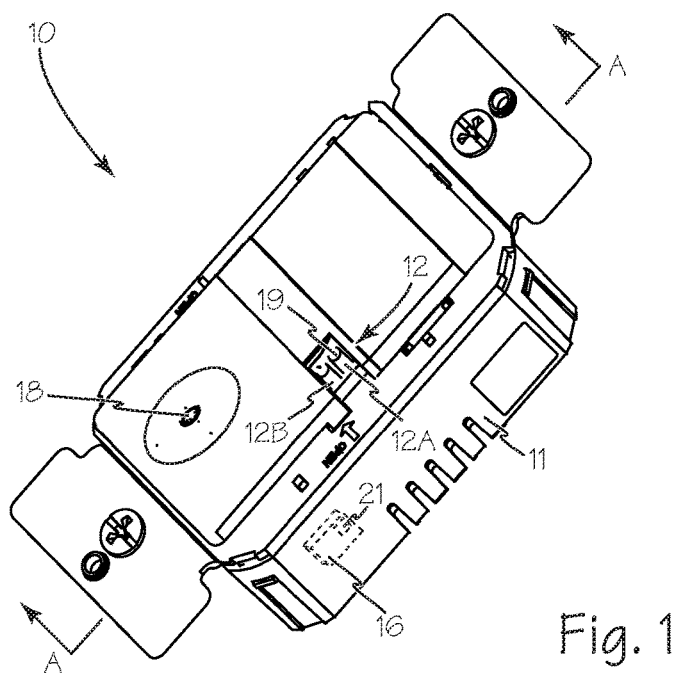
FIG. 1 is a perspective view of a wall switch with the occupancy sensor included.
Figure 2:
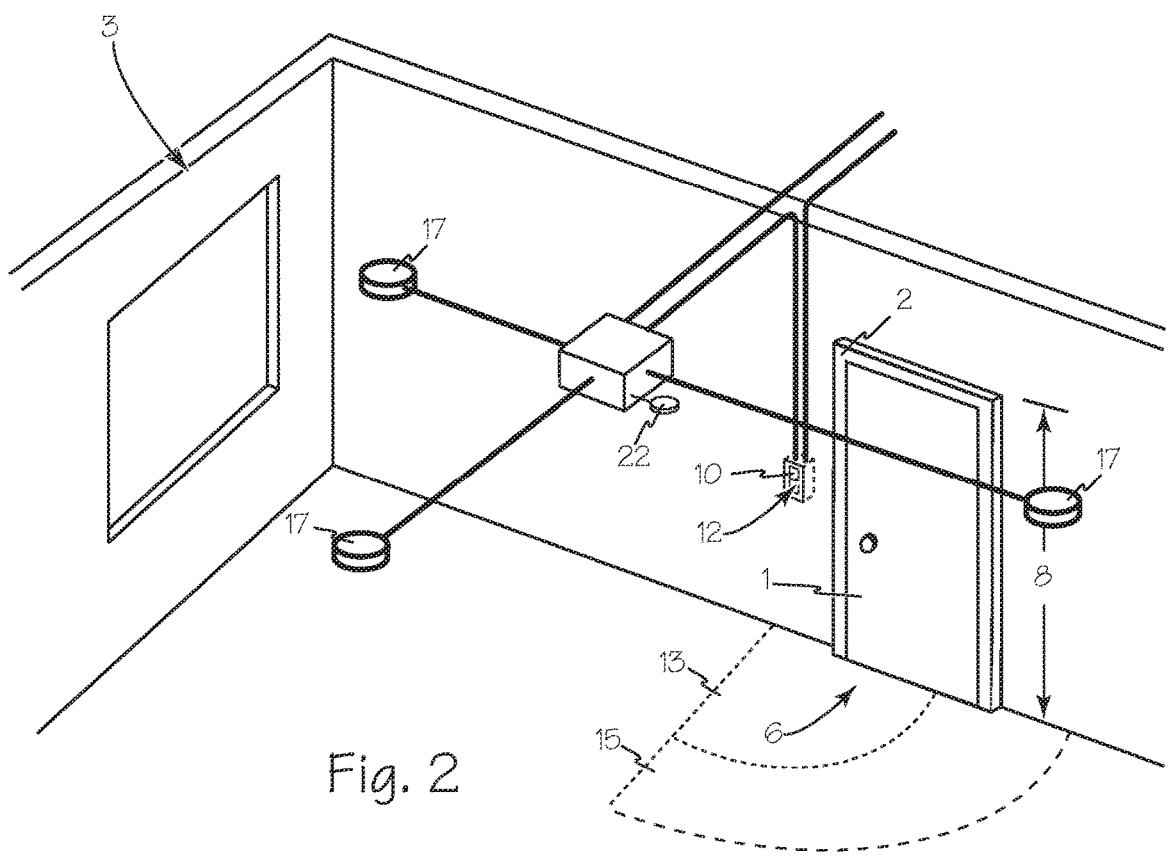
FIG. 2 is a perspective view of a room with a door and electric loads controlled by the wall switch/occupancy sensor of FIG. 1.
Figure 3:
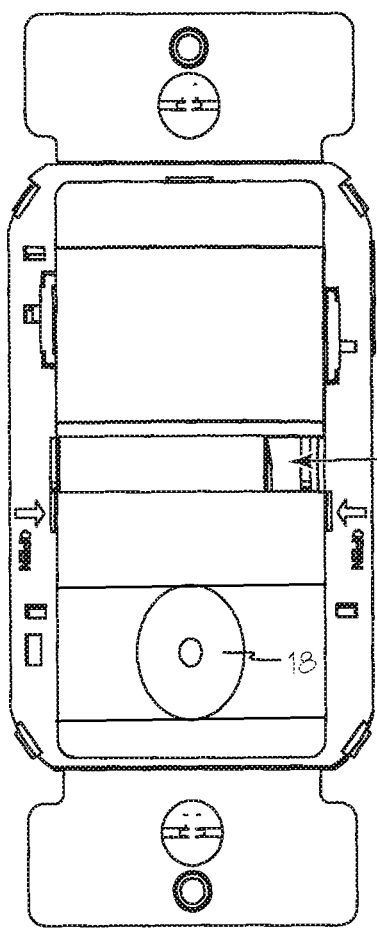
FIG. 3 is a front view of the wall switch/occupancy sensor of FIG. 1.
Figure 4:
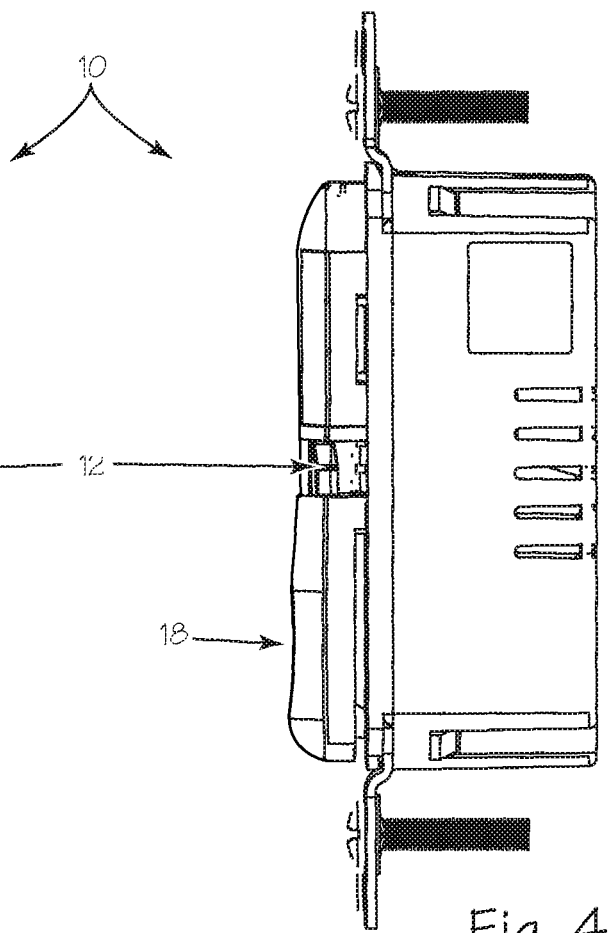
FIG. 4 is a side view of the wall switch/occupancy sensor of FIG. 1.

Sensor switch 10 of 1 and 2 includes one or more proximity sensors such as sensors 12 incorporated into housing 11 to detect the opening of door 1 and/or the entry or exit of one or more persons into or out of room 3.

The term wall switch will be used to refer to any load control device that is mounted on a wall such as wall 4 near a door opening such as doorway or opening 6 at about ½ the height 8 of the opening into which the device may be implemented. Proximity sensing technology, preferably suitable for detecting people, is employed such that the proximity sensing zone or zones are oriented off of the side of the switch toward the door opening.

The side looking proximity sensor 12 has two zones of monitoring: a first monitoring zone 13 close to the door opening; and a second monitoring zone 15 at a slight distance away from the door opening into the room. This allows determination of direction, e.g., the sensor for first zone 13, sensor 12A, is activated before the sensor for second zone 15, sensor 12B the person enters. If second zone 15 is activated first, then the person is exiting. A counter, microprocessor, controller or other suitable device such as controller 16 are connected to and receive signals from active sensors 12 and secondary sensor 18 to control operation of load control device 10. Controller 16 is programmed to track persons entering and exiting room 3 as well as implement suitable control algorithms such as control algorithm 21. When the controller determines that no persons are left in the room, the connected loads, loads 17 may be powered off.

Secondary sensor 18 maintains the application of electrical energy to the loads based on standard occupancy sensing (e.g., passive infrared, ultrasound, sound, etc.) and may be a daylight sensor, as both are known in the art. Signals from secondary sensor 18 may optionally be used to confirm when no one is left in the room. When no one is in the room, the lights are preferably turned out to save energy. For example, once side looking proximity sensor 12 at the doorway is triggered, it sends a corresponding signal to the controller, and occupancy is confirmed by secondary sensor 18 which sends a corresponding occupancy signal to the controller, controller 16 sets, selects or establishes a very long time-out period and there is very little chance of a faults off. If side looking proximity sensor 12 at the doorway is triggered, sending a corresponding signal to the controller, and occupancy is not confirmed by secondary sensor 18 which sends a corresponding non-occ signal to the controller, controller 16 sets, selects or establishes a very short time-out period. Literally in seconds in some residential application like a closet but longer in an office but this is where the counting of addition entries can be used.

The proximity sensors such as sensors 12A and 12B of may adopt any suitable technology such as infrared consisting of a transmitter and receiver. These may be narrow beam transmitters or receivers, or they may employ lenses 19, such as a Fresnel lens, to restrict the size and direction of the monitored zone. Positioning of the side looking sensors would need to account for the geometry at wallbox 5 and door opening 6, and specifically the likely presence of trim or molding 2 around the door opening. Side looking sensors 12 need to be oriented such that their monitoring zones, zones 13 and 15, are not blocked by this trim.

Typically, wall switches include a face plate or wall plate that is decorative but that also serves a safety function. Typically, wall switches are designed such that they are flush with the wall plate at the perimeter of the opening in the wall plate. In such cases, the wall switch may need to be designed to protrude slightly away from the wall plate to allow the transmitter and receiver to be oriented toward the doorway and not be blocked by the wall plate. A protrusion of 1-2 mm is preferred to maintain the decorative look of the wall switch and wall plate, but smaller protrusion for just the transmitter and/or receiver may be done and integrated with decorative features in the wall switch or wall plate, e.g., a sea shell scalloped design normally lends itself to raised areas suitable for the transmitter or receiver. Alternatively, recesses or channels may be formed in the wall plate to allow the energy to be directed without being blocked, and these recesses or channels may be functional in that they may help direct or collect the energy.

A first monitored zone 13 is established very close to the door opening. The transmitter sends a beam of infrared light out across the door opening. If a person is coming through the doorway, the beam is reflected off of the person and a portion of the reflected beam is picked up by the receiver. The infrared beam may be continuous or pulsed.

Figure 5:
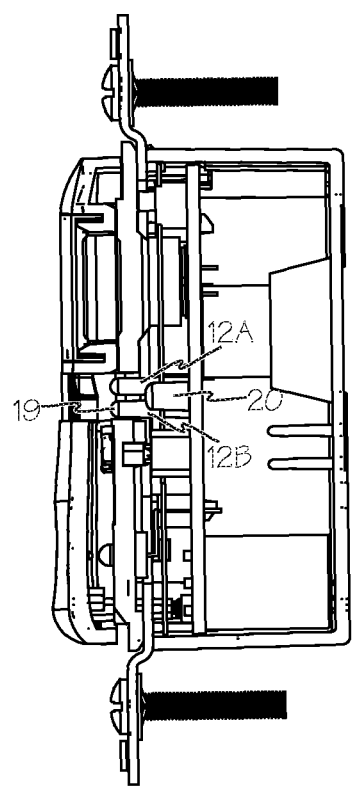
FIG. 5 is a cross section view of the wall switch/occupancy sensor of FIG. 1 taken along A-A.

If the infrared beams are pulsed, the first and second zone infrared transmitters may pulse at different frequencies to reduce the effect of any crosstalk or cross-contamination in the corresponding receivers. Two transmitters such as transmitters 12A and 12B may be used, but only one receiver such as receiver 20 as illustrated in FIG. 5, by coordinating the transmission and reception, e.g., transmitting on the first zone and waiting a period of time for a reflection, then alternating to the second zone, or by using different frequency transmitters, etc. The single receiver may require a lens, mirror or light pipe to pick up signals from each transmitter. A single transmitter and receiver may be used if they may be adjustably oriented to each of the first and second zones, e.g., by rotating the transmitter with a small gear assembly or motor or by rotating a lens. One or more mirrors may or light pipes may be used to direct the transmitted and received energy and these may also be adjustable. Transmitters and receivers, or their lenses or mirrors, may be manually rotatable within a limited range to make adjustments to the direction of each zone to maximize performance, e.g., the first zone may be adjusted slightly closer to the doorway and the second zone may be adjusted slightly more away from the doorway.

Normally, the transmitter and receiver, or their respective lenses or mirrors, would be oriented more or less orthogonally to the vertical orientation of the wall switch, that is, side looking straight out the side of wall switch. This orientation with a narrow beam system would work with adults but may not see small children. This may be addressed in several ways. Multiple transmitters may be provided, e.g., one oriented orthogonally and one angled downward. A single transmitter or its lens may be permanently oriented at a downward angle, but care must be taken to not mistake leg movements during walking for multiple persons entering or exiting a space. The transmitter and receiver may be designed to spread the beam across the lower portion of the doorway and receive reflected beams from the same area, e.g., using suitable lenses or mirrors. A single lens may have elements or lenslets that act to spread the transmitter beam out to the monitored zone and other elements that act to focus received energy on to a receiver.

Multiple people going through a doorway in either direction may be accounted for by taking the net of activity in the first and second zones. If the first zone has more activity, that would indicate a net exit and the count may be decremented, and visa versa. Other algorithms for handling multiple people are anticipated.

Alternatively, light pipes may be provided that blend with the wall plate or are built into the wall plate. These light pipes serve to send and receive the infrared energy used for proximity sensing.

Low power ultrasound may be used for proximity sensing at the doorway. It is preferred that two different ultrasonic frequencies be used to avoid cross talk; however, the same frequency may be used if the ultrasound is pulsed and pulsing for each zone is separated in time so as to reduce crosstalk. Small horn structures may be used to direct the ultrasonic energy to the monitored zone and to receive the reflected ultrasonic energy from that zone. Microwaves may also be used but may require special horns to properly direct and collect the energy. Other common occupancy sensing technologies may be adapted, such as a video camera based sensor configured to monitor the larger zone defined as the area between and including the first and second zones. Such a camera sensor may process the image to determine direction and keep a running count of entries and exits.

A single side looking sensor may be configured to mount to either side of the door in a number of ways. The sensor may be designed to simply be mounted upside down to go from the left side of a door to the right side of that door; small adjustments may be needed to ensure the energy is correctly directed in the new position. A bezel assembly or other suitable optical element at the front facing part of the side looking sensor, may include buttons and lenses or light pipes or mirrors, may be provided and changed out; a standard bezel assembly may be suitable for the left side and the alternate bezel assembly may be suitable for the right side.

A side looking sensor may be mounted to a wall that is immediately adjacent a doorway and orthogonal to the doorway, such as may occur if the door is placed at the end of a hallway that leads into a larger space. In this configuration the energy used for detection must be directed and collected from an area that is directly in front of the sensor or slightly to one side and not in a side looking direction. The techniques described above may be used to direct and collect this energy.

A single zone proximity sensor may be used in coordination with any suitable occupancy sensor that may be built into the wall switch with the side looking sensor such as sensor 18 or it may be a separate device, sensor 22, e.g., a ceiling mounted occupancy sensor if a wired or wireless communication path is established between the side looking sensor and occupancy sensor. The occupancy sensor may be any suitable type, such passive infrared, ultrasound, sound, gas (e.g., CO2), microwave, video based or combinations thereof. The occupancy sensor determines when there is no one in the space for a period of time, which may be adjustable. This establishes a known starting point for counting purposes. The level of activity measured by the occupancy sensor helps determine if people have entered or left the space, along with the proximity sensor activity. The first triggering of the proximity sensor indicates a person has entered the space (count is one), and this can be confirmed by the activity level measured by the occupancy sensor. The next signal at the proximity sensor is compared against the occupancy sensor activity to determine if there was an exit (no subsequent occupancy sensor activity, count goes to zero) or another entry (more subsequent occupancy sensor activity, count goes to two).

Two or more side looking switches or side looking occupancy sensors may be mounted into a space with two or more doors. They may keep track of their sensing zones (doorway and a portion of the space, such as a large conference room) independently, or they may be connected together, e.g., via a traveler wire, multi-wire cable or wirelessly as is known in the art, to send suitable messages to each other to share occupancy information and coordinate the control of lighting in the space. This may allow one of the side looking devices to turn off or dim lighting in its zone or monitored space if it believes there are no more people there while the other side looking device maintains lighting if it continues to believe that people are in its monitored space.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. An occupancy sensor system for controlling the application of electrical power to electrical loads in a room with a doorway within a door opening comprising:
    a load control device mounted adjacent to the doorway, the load control device having a housing and controller;
    a proximity sensor in the housing for sensing people passing through the doorway, the proximity sensor having two zones of monitoring and operably coupled to the controller to provide a signal to the controller when people pass through the doorway wherein the first monitoring zone is adjacent to the door opening and the second monitoring zone is at a distance away from the door opening;
    an occupancy sensor in the room for sensing when a person enters or leaves the room, the occupancy sensor operably coupled to the controller to provide a signal to the controller when a person enters or leaves the room;
    wherein the controller is programmed to apply power to the electrical loads upon detection of activation in the first monitoring zone before an activation in the second monitoring zone or disconnect power to the electrical loads upon detection of an activation in the second monitoring zone before activation in the first monitoring zone.

2. The occupancy sensor system of claim 1 wherein the controller is programmed to:
    apply power to the electrical loads in response to a first signal from the proximity sensor and a first signal from the occupancy sensor; and
    to establish a first time-out period; and
    apply power to the electrical loads in response to a first signal from the proximity sensor and a second signal from the occupancy sensor; and
    to establish a second time-out period with the second time-out period is shorter than the first time-out period.

* * * * *